US006799479B1

(12) United States Patent
Talaski et al.

(10) Patent No.: US 6,799,479 B1
(45) Date of Patent: Oct. 5, 2004

(54) WHEEL LOAD MEASUREMENT SYSTEM

(75) Inventors: Carl Talaski, Milford, MI (US); Paul Schwenke, Petosky, MI (US); Joel Schnackenberg, Charlevoix, MI (US); Jeff Menosky, Charlevoix, MI (US)

(73) Assignee: Michigan Scientific Corporation, Milford, MI (US)

( * ) Notice: Subject to any disclaimer, the term of this patent is extended or adjusted under 35 U.S.C. 154(b) by 62 days.

(21) Appl. No.: 10/217,507

(22) Filed: Aug. 13, 2002

(51) Int. Cl.$^7$ ............................................ G01M 17/013
(52) U.S. Cl. .................. 73/862.043; 73/118.1; 73/146; 73/862.637
(58) Field of Search ................ 73/118.1, 146, 73/11.04, 862.041, 862.042, 862.043, 760, 763, 767, 862.381, 862.621, 862.636, 862.637

(56) References Cited

U.S. PATENT DOCUMENTS

| | | | |
|---|---|---|---|
| 3,867,838 A | 2/1975 | Gerresheim | |
| 4,186,596 A | 2/1980 | Bohringer et al. | |
| 4,297,877 A | 11/1981 | Stahl | |
| 4,640,138 A | 2/1987 | Meyer et al. | |
| 4,748,844 A | 6/1988 | Yoshikawa et al. | |
| 4,821,582 A | 4/1989 | Meyer et al. | |
| 5,231,374 A | 7/1993 | Larsen et al. | |
| 5,604,317 A | 2/1997 | Jachmann et al. | |
| 5,817,951 A | 10/1998 | Cook et al. | |
| 5,894,094 A | 4/1999 | Kuchler et al. | |
| 6,038,933 A | * 3/2000 | Meyer | ................... 73/862.045 |
| 6,324,919 B1 | 12/2001 | Larsen et al. | |
| 6,439,063 B1 | 8/2002 | Schnackenberg | |
| 6,575,031 B2 | * 6/2003 | Haeg et al. | ................... 73/503 |
| 2002/0059837 A1 | * 5/2002 | Meyer et al. | .......... 73/862.042 |

OTHER PUBLICATIONS

U.S. patent application S. N. 09/330,951 for Wheel Load Transducer filed Jun. 11, 1999.

* cited by examiner

Primary Examiner—Eric S. McCall
(74) Attorney, Agent, or Firm—Young & Basile, PC (57) ABSTRACT

A wheel load measurement system mountable upon a wheel rim. The system includes a sensor body with an inboard ring connectable to the wheel rim, an outboard ring axially-spaced from the inboard ring and connectable to a hub adapter and a plurality of beams extending between the inboard ring and the outboard ring. A plurality of sensors, each fixed to an external surface of one of the beams, provides a signal indicating at least one of three principal forces and three principal moments experienced by the sensor body. In dual wheel mounts, an inboard and an outboard sensor body are coupled to a common hub adapter. The sensors of the inboard sensor body provide measurements for the inboard wheel, while the sensors of the outboard sensor body provide measurements for the outboard wheel.

12 Claims, 10 Drawing Sheets

WHEEL LOAD MEASUREMENT SYSTEM

BACKGROUND OF THE INVENTION

1. Field of the Invention

The present invention relates, in general, to apparatus for measurement of forces and moments acting on rotatable members and specifically to a wheel load measurement system for measuring forces and moments acting upon vehicle wheels.

2. Description of the Related Art

Wheel load transducers are known for attachment to a vehicle wheel to measure moments and forces, including torque, applied to the wheel. Such a transducer is typically in the form of an annular member affixed at an outer peripheral portion to a rim adapter welded to the wheel rim. The rim adapter has a plurality of circumferentially spaced apertures aligning with corresponding apertures in the outer periphery of the transducer for receiving bolts therethrough to fix the transducer to the wheel rim. A hub adapter, which also has a plurality of circumferentially spaced apertures, is mountable to the inner annular portion of the transducer and fastened thereto. The hub adapter includes a standard hole arrangement for attachment to vehicle wheel bolt lugs.

A plurality of radially-extending webs or beams connect the inner and outer annular portions of the transducer. Moments and forces observed on the wheel are measured by sensors, such as strain gages, which are adhesively affixed to exterior surfaces of the webs-or beams. Certain of the strain gages provide force measurements, while others are positioned to provide torque, steering and camber moment measurements.

Some of these transducers, however, are unable to measure vertical and fore and aft forces. More recently, a combined transducer/hub adapter has been introduced for use with the conventional transducer. The transducer/hub adapter has an outer, radially outward extending flange, a generally circular inner wall, and a plurality of webs or beams interconnecting the outer flange and the inner wall. The beams are in the form of a thin, cross-sectional strip having a radially inner surface, a radially outer surface and opposed side edges or walls upon which sensors are mounted for measuring the vertical and fore and aft forces. Another recent effort to measure these forces uses the conventional transducer, but modifies the beam by forming instead a stem extending from the inner annular portion of the transducer and a perpendicular crossleg unitarily formed with the stem and connected to the outer peripheral portion of the transducer. Sensors are mounted in wells formed in each of the stem and the crossleg.

While these transducers successfully measure moments and forces observed on the wheel, all transducers exhibit some degree of imperfection known as crosstalk. Crosstalk is a measurement error that occurs when forces or moments are applied at in directions at right angles to the desired measurement direction. Further, these transducers are unable to measure the forces and moments exerted on each of two wheels in a dual wheel mount.

Thus, there is desire to develop transducers that can also be used to provide forces and moments measurements for dual wheel sensing. It is also desirable that the transducers minimize crosstalk.

SUMMARY OF THE INVENTION

The wheel load measurement system described minimizes the number of components needed to measure forces and moments respectively experienced by one or more wheels while minimizing crosstalk. A first aspect of the system is mountable upon a wheel rim supporting a wheel. The wheel rim is rotatable about an axis of rotation. The system includes a sensor body including an inboard ring connectable to the wheel rim, an outboard ring connectable to a hub adapter, the outboard ring axially-spaced from the inboard ring, and a plurality of beams extending between the inboard ring and the outboard ring. The system also includes a plurality of sensors, each of the plurality of sensors fixed to an external surface of one of the plurality of beams. The plurality of sensors is operable to provide a signal indicating at least one of three principal forces and three principal moments experienced by the sensor body.

Another aspect of the system measures forces and moments on respective wheels of a dual wheel pair. This dual wheel load measurement system is mountable upon an inboard wheel rim supporting an inboard wheel of a dual wheel pair and an outboard wheel rim supporting an outboard wheel of the dual wheel pair. The inboard wheel rim and outboard wheel rim are rotatable about a common axis of rotation. The system includes a first sensor body including a first inboard ring connectable to the inboard wheel rim, a first outboard ring connectable to a hub adapter, the first outboard ring axially-spaced from the first inboard ring, and a first plurality of beams extending between the first inboard ring and the first outboard ring. The system also includes a first plurality of sensors, each of the first plurality of sensors fixed to an external surface of one of the first plurality of beams. The first plurality of sensors is operable to provide a signal indicating at least one of three principal forces and three principal moments experienced by the first sensor body.

The dual wheel load measurement system includes a second sensor body axially adjacent to the first sensor body. The second sensor body includes a second inboard ring connectable to the outboard wheel rim and identical to the first inboard ring, a second outboard ring connectable to the hub adapter, the second outboard ring identical to the first outboard ring and axially-spaced from the second inboard ring, and a second plurality of beams extending between the second inboard ring and the second outboard ring. A second plurality of sensors is operable to provide a signal indicating at least one of three principal forces and three principal moments experienced by the second sensor body. Each of the second plurality of sensors fixed to an external surface of one of the second plurality of beams.

Other features of the system are contemplated and are described herein in detail.

BRIEF DESCRIPTION OF THE DRAWINGS

The various features, advantages and other uses of the present invention will become more apparent by referring to the following detailed description and drawing in which like reference numerals refer to like parts throughout the several views and in which.

DETAILED DESCRIPTION

Figure 1:
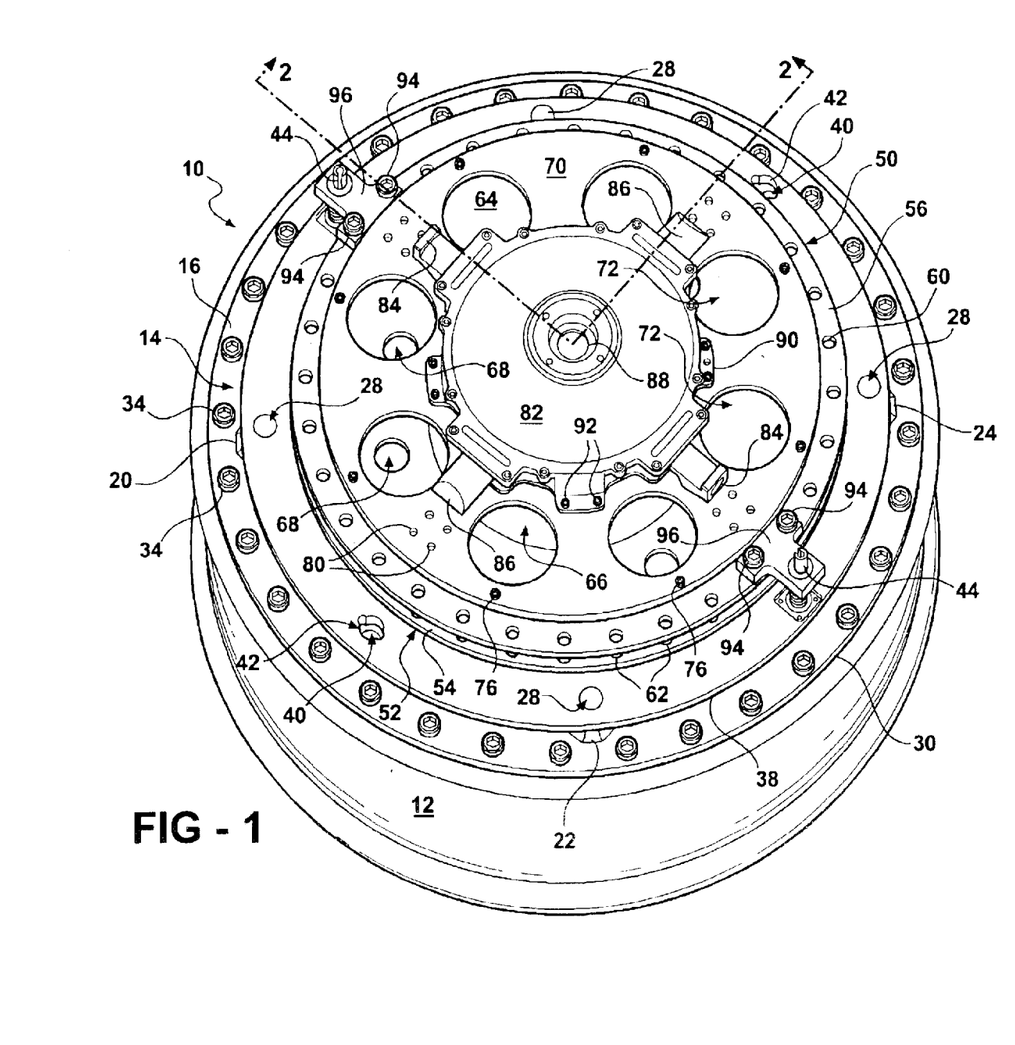
FIG. 1 is a partial perspective view of one aspect of the wheel load measurement system according to the present invention.

One aspect of the wheel load measurement system 10 is shown mounted on a wheel rim 12 in FIG. 1. The system 10 generally includes a sensor 14, a hub adapter 50 and a housing 82. The sensor 14 shown is a unitary sensor body having an annular ring 16 and an axially-spaced annular ring 18 coupled by four beams 20, 22, 24 and 26. (Beam 26 is not shown in FIG. 1.) Of course, the sensor 14 can be formed in other ways, such as by welding or otherwise coupling these separate components together. The annular ring 16 is closer in relation to the axis extending in the direction of travel through the center of a vehicle (not shown) upon which the wheel rim 12 is mounted than is the annular ring 18. Therefore, the annular ring 16 is referred to as the inboard ring 16, while the annular ring 18 is referred to as the outboard ring 18.

The outboard ring 18 shown has a smaller diameter than the inboard ring 16. Extending through each beam 20, 22, 24, and 26 is an aperture 28, also called a beam hole 28, which also extends through the inboard ring 16 and the outboard ring 18. Thus, each hole 28 is cylindrical in shape and simultaneously serves the purposes of making the sensor 14 lighter and providing a path for the flow of air through and around the wheel load measurement system 10. The outer surface of each beam 20, 22, 24, 26 is preferably the same shape, octagonal in the described aspects, but can be any appropriate shape such that placement of the strain gages, shown in FIG. 4 and discussed herein, result in the determination of the three principal forces and three principal moments experienced by a wheel (not shown) mounted on the wheel rim 12. Of course, this describes the preferred use of the invention where all six quantities are measured, but any one of the principal forces and moments can be determined by the appropriate placement of strain gages on the beams between the inboard ring 16 and the outboard ring 18.

Along the outer annular edge 30 of the inboard ring 16 are a plurality of bolt holes 32 (shown in FIG. 3), through which a plurality of bolts 34 secure the sensor 14 to the wheel rim 12. The inboard ring 16 can alternatively be welded to the wheel rim 12. The beams 20, 22, 24, 26 are equally spaced around the inner annular edge 36 (see FIG. 2) of the inboard ring 16 and the outer annular edge 38 of the outboard ring 18. Apertures 42 extend through the outboard ring 18 and are spaced between each of the adjacent pairs of beam holes 28. Optionally, apertures 40 (only one shown) extend through the inboard ring 16 and are located in the same axial path as the apertures 42. The apertures 40, 42 provide a passage for signals from the sensor 14 and an optional second sensor 214, described in more detail herein. When not used, the apertures 40, 42 provide air passages for cooling.

At least one terminal connector 44 is mounted in an aperture 42. The terminal connector 44 sends supply signals from a housing 82 to strain gage grids 20a-bb, 22a-bb, 24a-bb and 26a-bb (shown in FIG. 4) mounted on the beams 20, 22, 24, 26. The terminal connector 44 also receives output signals from the strain gage grids and supplies them to the housing 82. These signals and the strain gage grids are described in more detail herein. Only one terminal connector 44 for signals to and from the beams 20, 22, 24, 26 is needed. Due, however, to the number of signals being sent and received and the practical difficulties of wiring using only one terminal connector 44, at least two terminal connectors 44 are preferable, as is shown in the figures.

Figure 2:
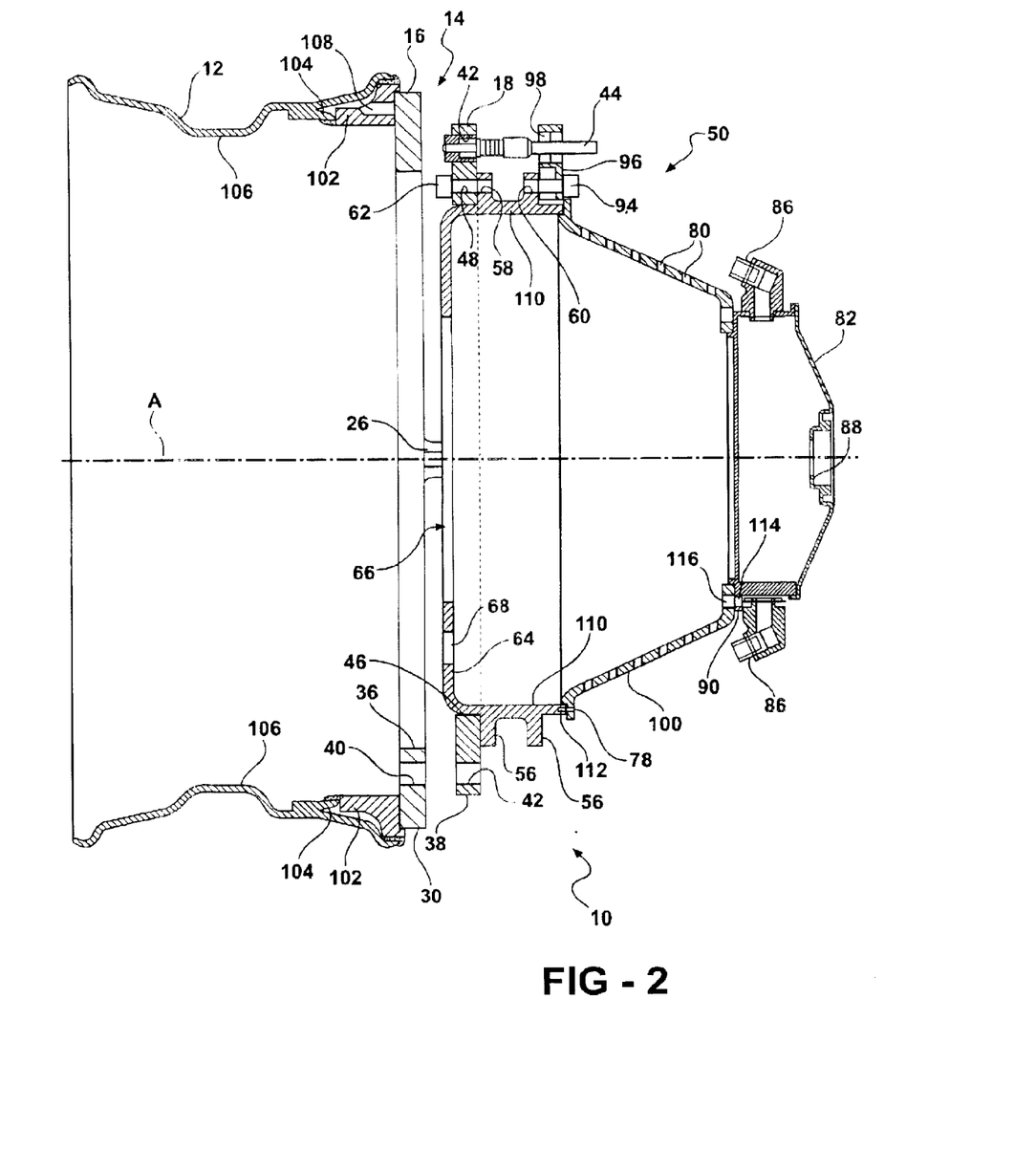
FIG. 2 is a cross-sectional view of the wheel load measurement system according to FIG. 1 with a different hub adapter and housing connector configuration.

Along the inner annular edge 46 of the outboard ring 18 are a plurality of bolt holes 48, shown in FIG. 2, which are used to couple a hub adapter 50 to the sensor 14. Specifically, the hub adapter 50 includes a first member 52 with two bolt flanges 54, 56. The body 64 of the first member 52 forms a central aperture 66, centered on the axis of rotation A. Around the central aperture 66 are a plurality of holes 68 for fastening the hub adapter to the vehicle axle. Each of the bolt flanges 54, 56 extend radially from the outer radial surface of the body 64. A plurality of bolt holes 58 of the first bolt flange 54 are coupled to the bolt holes 48 of the outboard ring 18 using bolts 62, fixing the first member 52 of the hub adapter 50 to the sensor 14. The second bolt flange 56 has a plurality of bolt holes 60, which are not used in this aspect of the system 10.

A second member 70 of the hub adapter 50 is secured to the first member 52. The second member 70 shown in FIG. 1 is an essentially circular plate with a plurality of air circulation holes 72 in its surface arranged about the outer annular edge 74 of the second member 70. The size and number of the air circulation holes 72 can vary. Also arranged about the outer annular edge 74 is a plurality of bolts 76, which bolts 76 secure the second member 70 to the first member 52 through bolt holes 78 (shown in FIG. 2) in the surface of the second member 70.

Extending from the outer annular edge 74 of the second member 70 towards the center of the second member 70 are a plurality of small apertures 80, which are arranged in two rows between alternating air circulation holes 72. These small apertures 80 provide a means for positioning cable ties 126 to secure a two-ended connector 118, shown in FIG. 3 and described in further detail herein.

A housing 82 is mounted on the second member 70 centered on the rotational axis A (shown in FIG. 2). The housing 82 shown includes a first set of opposed terminal connectors 84 and a second set of opposed terminal connectors 86. The small apertures 80 extend to these terminal connectors 84, 86. That is, the small apertures 80 extend from the outer annular edge 74 of the second member 70 to the portion of the housing 82 where the connectors 84, 86 are located. Embedded in the top of the housing 82 on the rotational axis A of the wheel is a connector 88 for a slip ring. The housing 82 provides twelve amplifier channels (not shown), mounted on a circuit board, that receive signals through the terminal connectors 84 or 86 or both, amplify the signals received, and provide the outputs to a slip ring through the connector 88. The housing 82 is mounted upon the second member 70 with feet 90 bolted into the outer axial surface of the second member 70 with bolts 92.

Although four terminal connectors 84, 86 are shown in FIG. 1 the number of terminal connectors actually needed is equal to the number of terminal connectors from the sensor 14 (and sensor 214 described herein) that are needed to transmit the signals from the strain gages. In the aspect according to FIG. 1, only one terminal connector 84 or 86 need be included. Although two each of terminal connectors 84 and 86 ate shown in FIG. 1, which terminal connectors are actually used can vary. The terminal connector 86 provides a generally axial connection, i.e., one directed roughly radially toward the outside edge 30 of the inboard ring 16. The terminal connector 84 provides a choice of two connections, one directed roughly radially toward the outside edge 30 of the inboard ring and the other extending axially from the housing 82. Which terminal connectors are used depends largely upon the shape of the second member 70 of the hub adapter 50.

Bolts 94 couple a support 96 for the terminal connector 44 to the second bolt flange 56 through the bolt holes 60. The support 96 has an aperture 98 through which the terminal connector 44 projects. A rubber grommet or ring can be used to stabilize the terminal connector 44 in the aperture 98. The support 96 protects the terminal connector 44 from vibrating during operation, possibly interrupting signals from the strain gages needed to calculate the forces and moments described herein.

The cross-sectional view in FIG. 2 illustrates several additional features of the aspect according to FIG. 1 including some small differences. Namely, in FIG. 2, the second member 100 replaces the second member 70 from FIG. 1, and the terminal connectors 84 of the housing 82 have been replaced by terminal connectors 86. Since the same features previously described with respect to the second member 70 exist with respect to the second member 100, the reference numerals for features of the second member 70 are, when appropriate, used in FIG. 2. FIG. 2 represents a roughly cross-sectional view along line segments 2—2 in the direction shown with respect to FIG. 1. FIG. 2 is "roughly" cross-sectional because certain features are included for illustrative purposes. For example, the small apertures 80 of the second member 100 are included, but would not necessarily be located along the path indicated by the line segments 2—2.

The system 10 is mounted on a wheel rim 12. As was shown in FIG. 1, the inboard ring 16 of the sensor 14 is mounted on the wheel rim 12 by bolts 34 extending through bolt holes 32 along the outer annular edge 30 of the inboard ring 16. In the cross-sectional view of FIG. 2, this mounting is shown in further detail. The wheel rim 12 is a standard wheel rim modified by removing the existing wheel disk (not shown). A mounting member 102 has been added, modifying the wheel rim 12. By example, the mounting member 102 is an annular steel insert in the shape of a cornice welded at one end to an annular leg 104 extending from the inside surface 106 at the wheel rim 12 axially towards the sensor 14. The annular leg 104 shown is a portion of the removed wheel disk, but a separate annular leg 104 can be welded to the inside surface 106 of the wheel rim 12. The mounting member 102 extends axially from the annular leg 104 and is preferably welded to the inside surface 106 at the outer axial edge of the wheel rim 12. The mounting member 102 then extends radially from this point on the wheel rim 12 for a width sufficient to securely support and mount the inboard ring 16 of the sensor 14. In this case, the mounting member 102 has a width sufficient to include a plurality of bolt passages through which the bolts 34 can be secured. To show the placement therein, a bolt passage 108 is shown within the mounting member 102 in FIG. 2. Of course, this modification of the wheel rim 12 to support the sensor 14 and the remainder of the wheel load measurement system 10 is only one example of a suitable mounting member 102. The mounting member 102 can, for example, be of a different shape. The mounting member 102 can also be other than an annular member; it could include a plurality of mounts spaced around the circumference of the inside surface 106.

The first member 52 of the hub adapter 50 is also shown in further detail in FIG. 2. The body 64 of the first member 52 is essentially annular and extends radially to fit, preferably snugly, within the inner annular edge 46 of the outboard ring 18. The body 64 then extends axially toward the second member 100, forming a cylindrical sidewall 110 with an axial edge upon which the second member 100 is mounted. Extending radially from the outside annular surface of the sidewall 110 are the bolt flanges 54, 56. The second member 100 is bolted to the first member 52 by bolts 76 (shown in FIG. 1) inserted through each of the bolt holes 78 and corresponding bolt passages 112 (only one shown).

The second member 100 is roughly conical in shape, narrowing as it extends axially from its mounted position on the outer axial edge of the sidewall 10 to an outer axial surface supporting the housing 82. The outer axial edge of the second member 100 includes a plurality of bolt passages 116 that line up with the bolt hole 114 in feet 90 of the housing 82, shown in this view for clarity. The housing 82 is secured to the second member 100 by bolts 92 (like those shown in FIG. 1) through the bolt holes 114 and the bolt passages 116. The outer axial surface of the second member 100 supporting the housing 82 can form a central aperture to facilitate cooling of the housing 82. The amplifier channels of the housing 82 are omitted from FIG. 2, as are all the wiring connections described in further detail herein.

Figure 3:
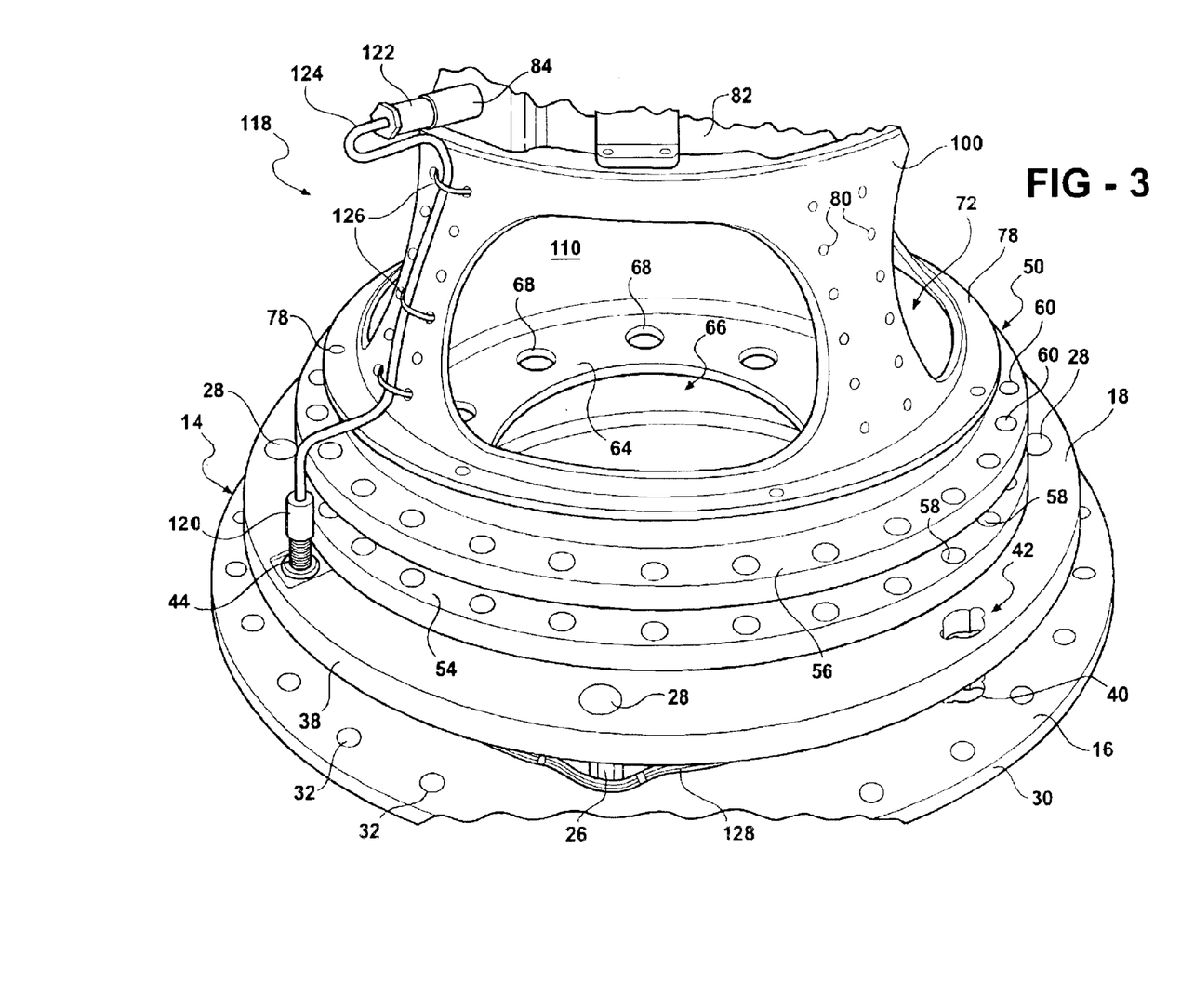
FIG. 3 is a partial perspective view of the wheel load measurement system according to FIG. 1 with the hub adapter of FIG. 2.

FIG. 3 is a simplified view of the system 10 according to FIG. 1 including the second member 100 of FIG. 2 used to show a terminal connector 84 operatively connected to the terminal connector 44 by a two-ended connector 118. The two-ended connector 118 includes a female connector 120 coupled to the terminal connector 44 and a male connector 122 coupled to the terminal connector 84. A cable 124 couples the female connector 120 and the male connector 122. The cable 124 is tied down to the second member 100 by cable ties 126, each threaded through two of the small apertures 80. The support 96 for the terminal connector 44 is not included in this depiction so that the connection between the terminal connector 44 and the female connector 120 can more easily be seen.

Figure 4:
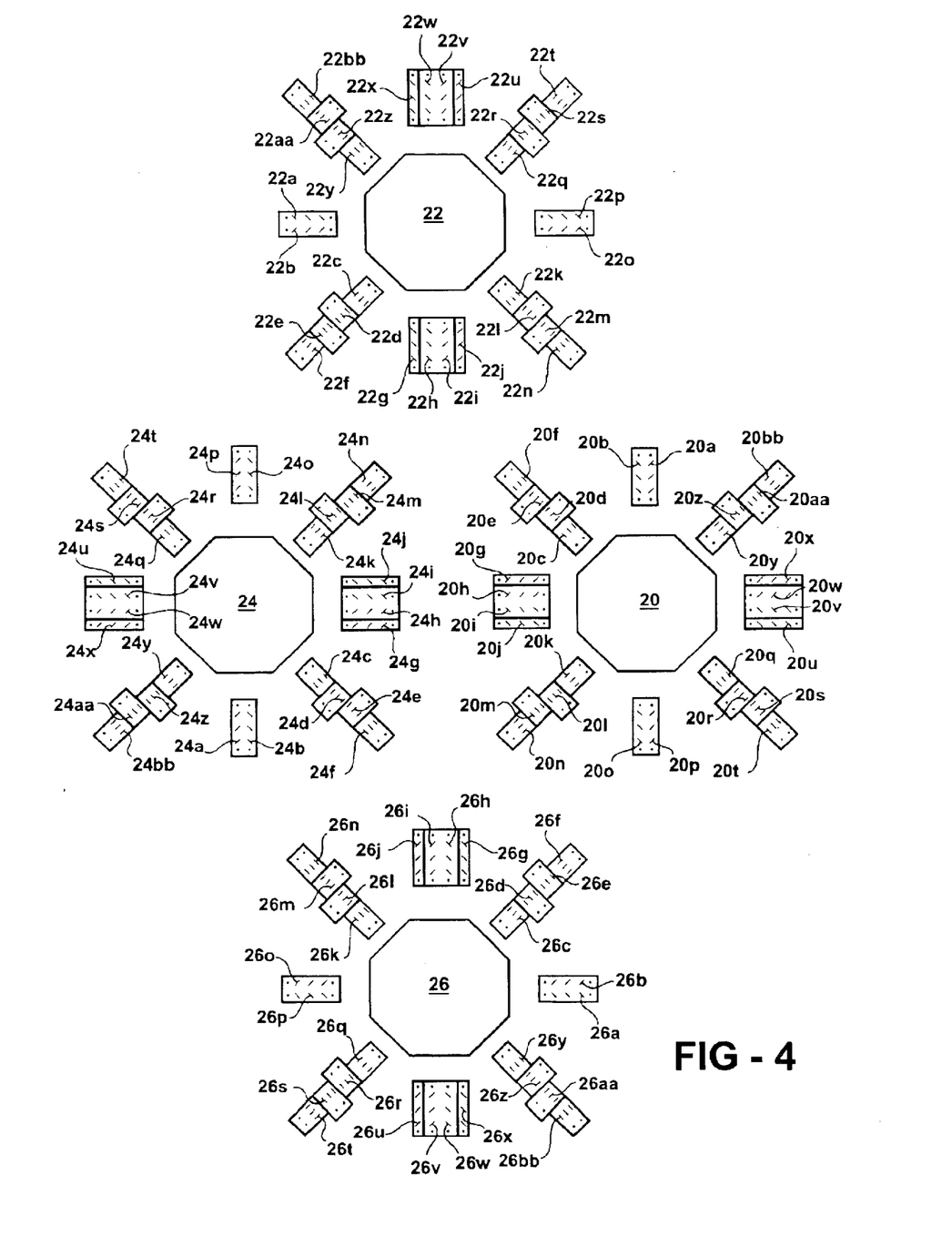
FIG. 4 is a diagram showing one possible layout of strain gages of the wheel load measurement system according to FIGS. 1–3.

Upon each beam 20, 22, 24, 26 is mounted a plurality of strain gages incorporating strain gage grids 20*a-bb*, 22*a-bb*, 24*a-bb* and 26*a-bb*, which are shown and described with respect to FIG. 4. A conductor, or wire, 128 (shown in FIG. 3) is connected to each strain gage grid, each wire 128 providing a means of conducting signals between the strain gage grids themselves and between the strain gage grids and the housing 82. The connections of the plurality of wires will be described in more detail with respect to FIGS. 5–10.

One possible placement of the strain gages is shown in FIG. 4 for an aspect of the invention with four octagonal beams 20, 22, 24 and 26. FIG. 4 shows the outline of the surfaces of the beams 20, 22, 24, 26 and the arrangement of the strain gages supporting each of strain gage grids 20*a-bb*, 22*a-bb*, 24*a-bb* and 26*a-bb* upon the surfaces. Because the beams are octagonal, the external surface of each beam has eight sides comprising two opposed radial surfaces, two opposed axial surfaces perpendicular to the radial surfaces and four connecting surfaces. Each connecting surface is adjacent to one of the two opposed radial surfaces and one of the two opposed axial surfaces. FIG. 4 is a plan view facing the outboard ring 18. The strain gages are drawn radially extending from each surface of each beam 20, 22, 24, 26 to illustrate their actual placement on the respective beam. Thus, the ends of the gages closest to the surface of the beam are closest to the outboard ring 18, while the ends of the gages furthest from the surface of the beam are closest to the inboard ring 16. Thus, for example, on beam 20, the strain gage supporting strain gage grid 20y is closest to the outboard ring 18, while the strain gage supporting strain gage grid 20bb is closest to the inboard ring 16. For simplicity, details of the gages and the wiring thereto are not shown. However, given the description of FIG. 4 and the bridge circuit diagrams shown in FIGS. 5–10, one of skill in the art can properly connect the strain gage grids 20a-bb, 22a-bb, 24a-bb and 26a-bb.

Two main types of strain gages are used in FIG. 4. Strain gage grids 20a, 20b, 20g–j, 20o, 20p, 20u–x, 22a, 22b, 22g–j, 22o, 22p, 22u–x, 24a, 24b, 24g–j, 24o, 24p, 24u–x, 26a, 26b, 26g–j, 26o, 26p and 26u–x are supplied by a combination of single and double 45° shear gages, collectively referred to as shear gages herein. The strain gage grids 20c–f, 20k–n, 20q–t, 20y-bb, 22c–f, 22k–n, 22q–t, 22y-bb, 24c–f, 24k–n, 24q–t, 24y-bb, 26c–f, 26k–n, 26q–t and 26y-bb are used to measure Poisson strains, which are those created in a material by an applied normal stress perpendicular to the axis of the applied stress. These grids are supplied by Poisson gages, here dual element, 90-degree rosette, or T-rosette, gages. The shear gages are mounted on the outer and inner radial surfaces of the octagonal beams 20, 22, 24, 26 and the opposed axial surfaces perpendicular to each of these surfaces, while two Poisson gages are located each of the remaining four surfaces, the connecting surfaces, of the beams 20, 22, 24, 26. The strain gages are mounted on each of the eight surfaces so that the strain gage grids are centered on a line extending axially along the center of each respective surface.

Review of the arrangement of the strain gages shown in FIG. 4 for one beam, for example beam 20, makes it clear that the arrangement is repeated as one proceeds counter-clockwise through the beams 22, 24, and 26, except that the arrangement rotates on the beams by 90° counter-clockwise on each of the respective beams. Thus, the same strain gage arrangement on beam 20 is shifted 180° on beam 24. Similarly, the arrangement of the strain gages on beam 22 is arranged 90° counter-clockwise from the strain gage arrangement on beam 20 and 180° from the strain gage arrangement on beam 26. Although the arrangement of the strain gages shown in FIG. 4 will provide the desired measurements with relatively high accuracy, other arrangements of the gages are possible. For example, the beams 20, 22, 24, 26 may be modified to a Z-shape, or another shape, such that the need for using Poisson gages is eliminated. Further, other arrangements of the strain gages may be used in an effort to reduce crosstalk and temperature effects, including the use of additional dummy gages.

The interconnections of the strain gage grids shown in FIG. 4 into Wheatstone (four-arm) bridge circuits capable of producing measures of the three principal moments and three principal forces experienced by the wheel rim 12 are shown in FIGS. 5–10. The conductors, or wires, 128 connect the 28 strain gage grids into six separate bridge circuits and provide a supply voltage 130 to each of the bridge circuits from the housing 82 through the terminal connector 84 and two-ended connector 118 to the terminal connector 44. The wires 128 also conduct signals from each of the bridge circuits through the terminal connector 44 and the two-ended connector 118, supplying them to the housing 82 through the terminal connector 84. These signals are output voltages 132, 134, 136, 138, 140 and 142, representative of the three principal moments and three principal forces. The amplified voltages are then supplied to a slip ring, such as slip ring 144 shown in FIG. 11, for vehicle diagnostics or other uses. Of course, fewer strain gages can be used and incorporated into fewer bridges if less than all six moments and forces are desired.

Figure 5:
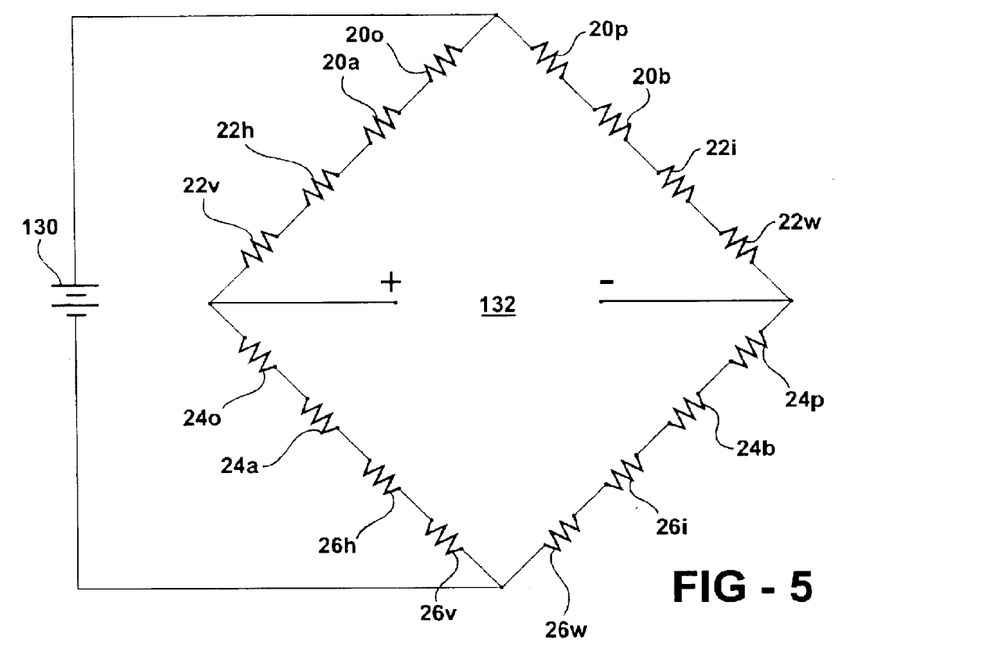
FIGS. 5–10 are strain gage bridge diagrams incorporating the strain gages of FIG. 4.
Figure 6:
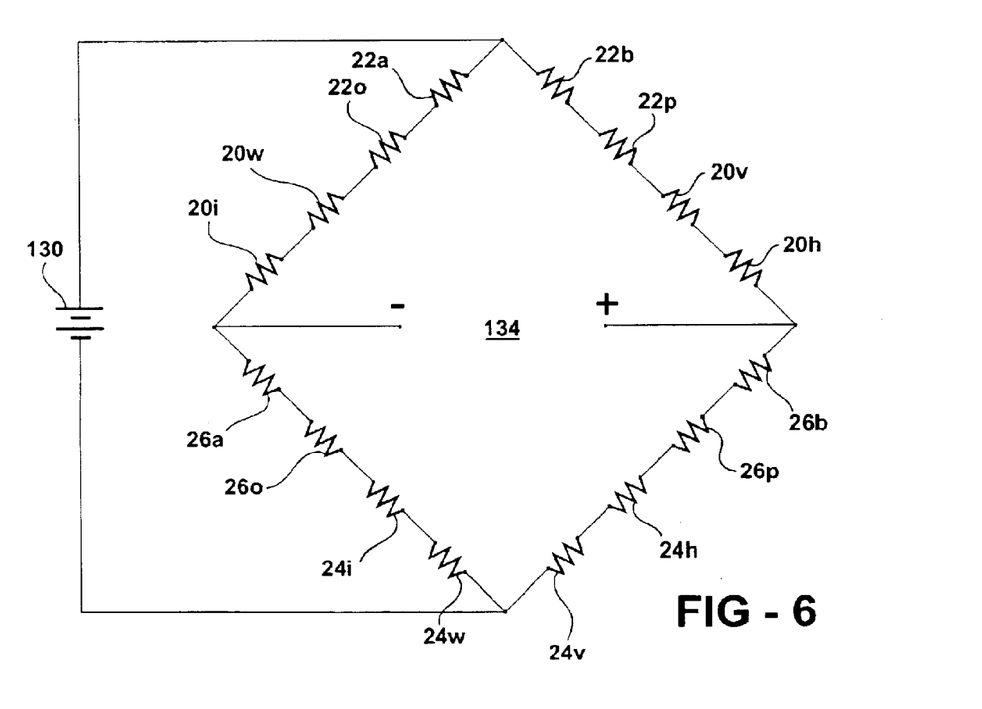
Figure 7:
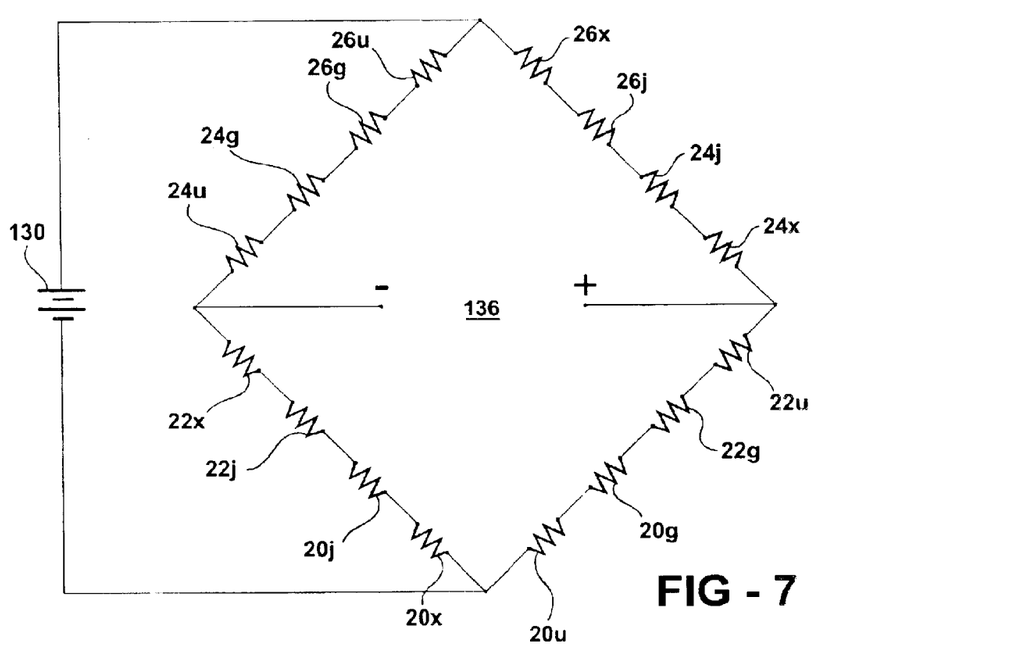

The force measured by the circuit in FIG. 5 is the force experienced by the outboard ring 18 either pushing it radially in the direction of beam 20 or radially in the direction of beam 24. When the force is positive, the outboard ring 18 and thus the wheel mounted upon the wheel rim 12 is experiencing a force pushing in the direction of beam 20. FIG. 6 shows the circuit that determines the force on the outboard ring 18 in the radial direction of either beam 26 or beam 22. When the measured force is positive, the outboard ring 18 and the wheel rim 12 are being pushed in the direction of the beam 26. The bridge circuit shown in FIG. 7 produces a measure of the torque on the outboard ring 18. The torque is the moment about the rotational axis A of the sensor 14. When the moment is positive, the outboard ring 18 is attempting to rotate counter-clockwise with respect to the wheel rim 12.

Figure 8:
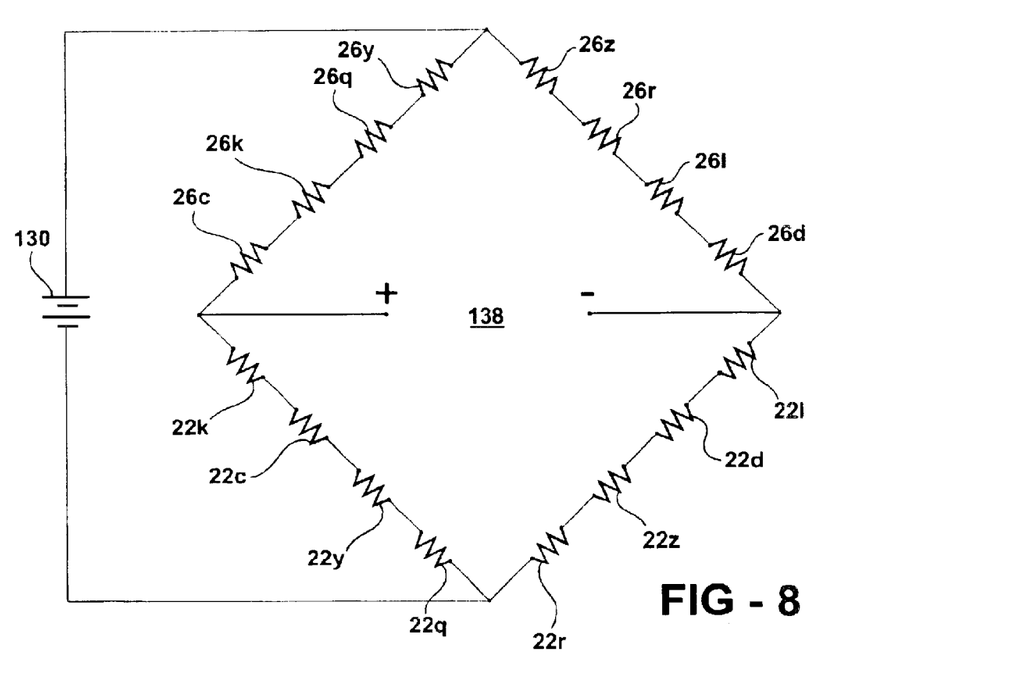
Figure 9:
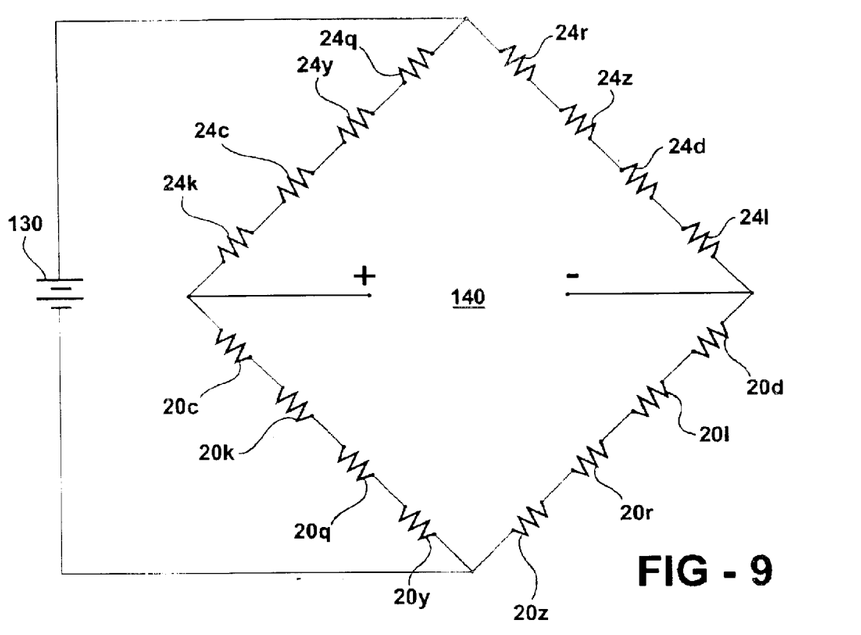

The remaining moments and axial force are measured using the Poisson gages. The circuits of FIGS. 8 and 9 measure camber and steer moments by measuring the relative tension and compression of opposed beams. A beam is in tension when the outboard ring 18 at that location is being forced away from the inboard ring 16, i.e., axial movement. A beam is in compression when the outboard ring 18 is being forced axially closer to the inboard ring 16. The camber moments indicate the "tilt" of the wheel. When the output of the four-arm bridge shown in FIG. 8 is positive, the beam 22 is in tension while the beam 26 is in compression. Thus, the wheel rim 12 is tilting so that at the location of the beam 22, the wheel is further from the vehicle than the wheel is at the location of the beam 26. Alternatively, if the output is negative, the beam 22 is in compression, while the beam 26 is in tension. The wheel rim 12 is tilting so that at the location of the beam 22 the wheel is closer to the vehicle than the wheel is at the location of the beam 26. Similarly, when the output of the four-arm bridge shown in FIG. 9 is positive, the beam 20 is in tension, and the beam 24 is in compression. When the output is negative, the beam 20 is in compression, and the beam 24 is in tension. This output similarly indicates the tilt of the wheel rim 12 and wheel with respect to the beams 20 and 24.

Figure 10:
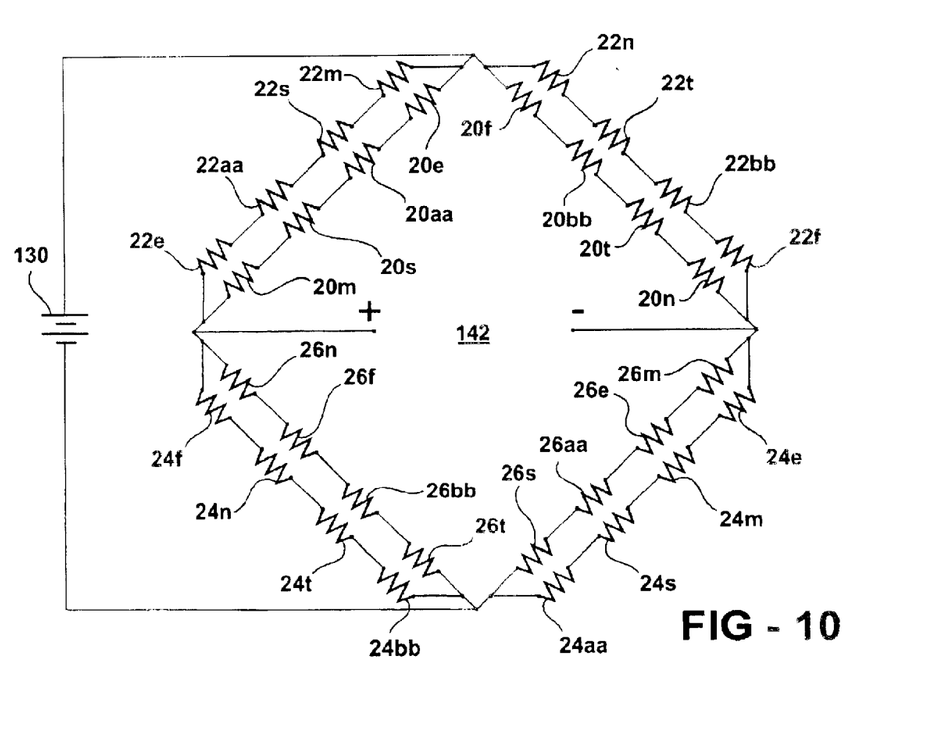

The final bridge circuit shown in FIG. 10 measures the pure axial force of the inboard ring 16 and the outboard ring 18 as they attempt to move towards and away from each other. When the output of the circuit in FIG. 10 is positive, the outboard ring 18 is attempting to move axially closer to the inboard ring 16, and the beams 20, 22, 24, 26 are in compression. Conversely, when the output is negative, the outboard ring 18 is being forced axially away from the inboard ring 16 and the beams 20, 22, 24, 26 are in tension.

Figure 11:
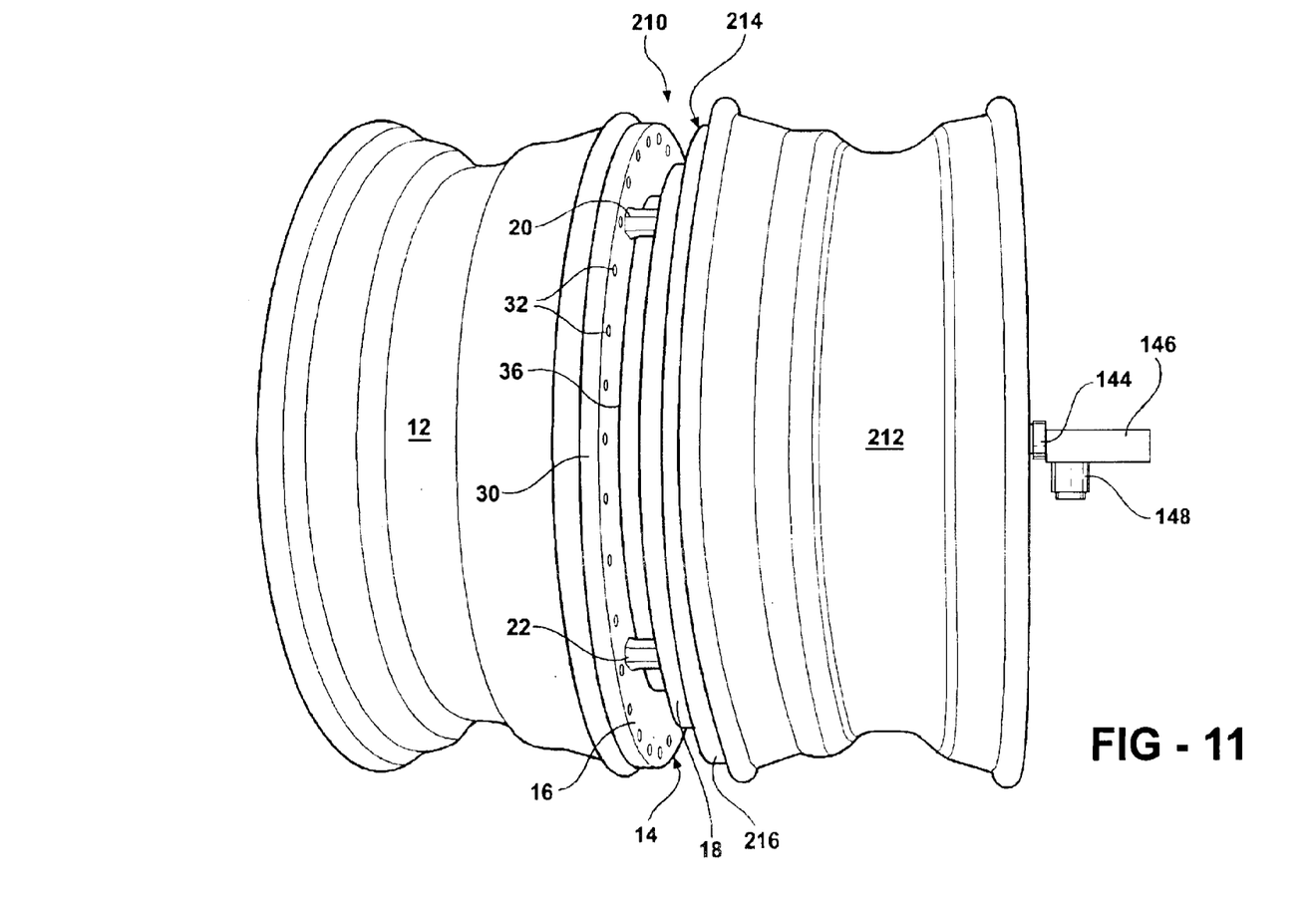
FIG. 11 is a perspective view of a second aspect of the wheel load measurement system.

These four-arm bridge circuits supply signals to the amplifiers of the housing 82. Details concerning suitable amplifiers can be had by referring to U.S. Pat. No. 5,231,374, the entire contents of which are incorporated herein by reference. As described therein, the outputs from the various amplifiers of the housing 82, here referred to as voltages 132, 134, 136, 138, 140 and 142, are supplied to a slip ring connected to the slip ring connector 88. FIG. 11 shows such a rotatable slip ring 144 in another aspect of the wheel load measurement system 210. The rotatable slip ring 144 is coupled to a fixed housing 146. Output wires from the housing 146 extend to a connector 148 to a tubular member or conduit (not shown), which is mounted in a fixed position on the vehicle for carrying the conductors to a data acquisition unit mounted on the vehicle. The tubular member or conduit holds the housing 146 in a fixed position relative to the rotating slip ring 144. Larsen et al. describe a suitable slip ring in U.S. Pat. No. 5,231,374.

The construction of the single wheel load measurement system 10 measuring the forces and moments acting upon one wheel mounted on a single wheel rim 12, and particularly those aspects described with reference to FIGS. 1–10, will now be described. First, the bolt holes 32 of the inboard ring 16 are lined up with the bolt holes 108 of the wheel rim 12. The bolts 34 are then threadingly inserted through these holes 32, 108, securing the sensor 14 to the modified wheel rim 12. The strain gages are secured by a suitable adhesive, such as an epoxy, to each of the beams 20, 22, 24, 26. The wires 128 are connected between the appropriate strain gage grids 20a-bb, 22a-bb, 24a-bb, 26a-bb, and the wires 128 from the resulting bridge circuits are directed towards the outside edge 38 of the outboard ring 18 terminating at connector(s) 44. Next, the first member 52 of the hub adapter 50 is placed within the inner annular edge 46 of the outboard ring 18 such that the central aperture 66 faces the inboard ring 16. The inner axial surface of the first bolt flange 54 rests upon the outer axial surface of the outboard ring 18. The first member 52 is aligned with the outboard ring 1 such that the bolt holes 48 of the outboard ring 18 and the bolt holes 58 of the first bolt flange 54 form a passage. The bolts 62 are then used to secure the first member 52 to the outboard ring 18 by threading the bolts 62 through the bolt holes 48 and the bolt holes 58.

The support 96 is next bolted through a bolt hole 60 in the second bolt flange 56 using the bolts 94. One or more terminal connectors 44 are then mounted using a respective conductor, or wire, passage 42 of the outboard ring 18. These terminal connectors 44 generally slide through the aperture 98 of the support 96 and the passage 42 and are retained in the mating socket. The free ends of the wires 128 are then appropriately coupled to the connector 44. All of the conductive parts, wires 128 and the ends of terminal connectors 44, are covered with a water-tight protective coating, such as an epoxy, to protect them from the elements and from movement during rotation of a wheel on the wheel rim 12. Prior to the application of the epoxy, the wires 128 can be secured together by the use of cable ties (not shown).

Whatever second member, second member 70 or 100, by example, is used, the second member 70, 100 is next bolted onto the first member 52. The second member 70, 100 is chosen based upon the wheel disk removed from the wheel rim 12 and the size of the wheel rim 12. The bolt holes 78 of the second member 70, 100 are lined up with the bolt passages 112 in the sidewall 10 of the first member 52. Then, the bolts 76 threadingly secure the first member 52 and the second member 70, 100 through the bolt holes 78 and bolt passages 112. The housing 82, with its selected terminal connectors, whether terminal connectors 84 or 86 or a combination of both, is mounted on the second member 70, 100. Apertures 114 in the feet 90 of the housing 82 are lined up with apertures 116 in the outer axial surface of the second member 70, 100. The bolts 92 threadingly secure the housing 82 to the second member 70, 100 through the path formed by the apertures 114 and apertures 116.

Completing the connections that will provide the forces and moments is accomplished by attaching a two-ended connector 118 between each terminal connector 44 and one of the terminal connectors 84 or 86. A slip ring, such as slip ring 144, can then be engaged with the slip ring connector 88 of the housing 82.

Figure 12:
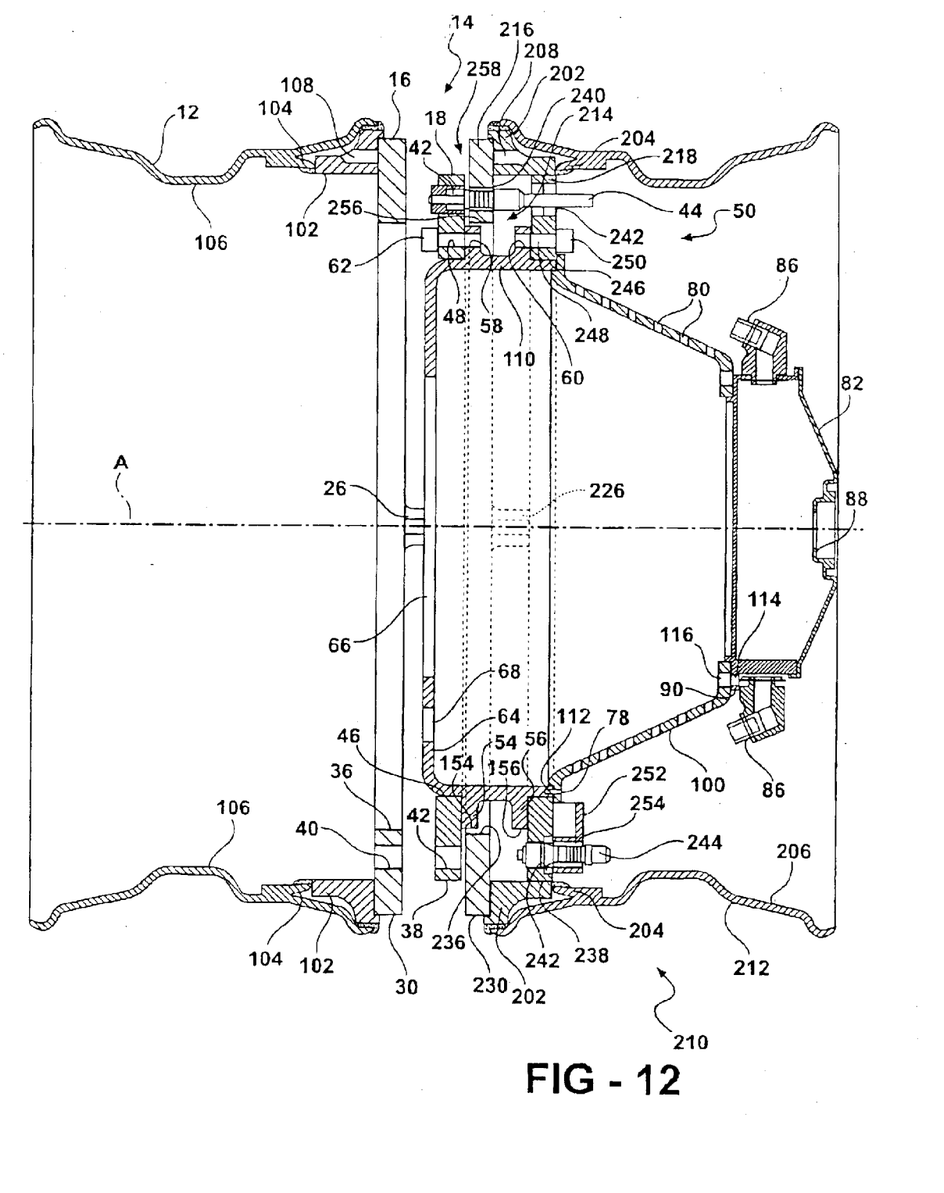
FIG. 12 is a cross-sectional view of the second aspect of the wheel load measurement system according to FIG. 11.

FIG. 11 shows a particularly desirable aspect wherein the wheel load measurement system 10 is a dual wheel load measurement system 210 for a dual wheel load arrangement. A dual wheel load arrangement includes two wheels mounted on respective, closely-adjacent wheel rims rotatable about the same wheel axle (not shown). In this aspect, the sensor 14, also referred to as the inboard sensor 14, is mounted in the space between the wheel rim 12, also referred to as the inboard wheel rim 12, and the outboard wheel rim 212. An outboard sensor 214, identical to the inboard sensor 14, is coupled to the inboard sensor 14 and is located inside the outboard wheel rim 212. The features previously described with respect to the inboard sensor 14 are repeated in the outboard sensor 214, so the reference numeral for each component of the outboard sensor 214 is the same as that used for the inboard sensor 14 incremented by 200. Thus, the outboard sensor 214 includes, generally, an inboard ring 216, shown in FIG. 11, having an outer annular edge 230 as shown in FIG. 12, an outboard ring 218 and four beams, each having an aperture 228 therethrough. The outboard ring 218 and the beam 226 are shown in FIG. 12. The other three beams are not shown, but are identical to beam 226.

Figure 13:
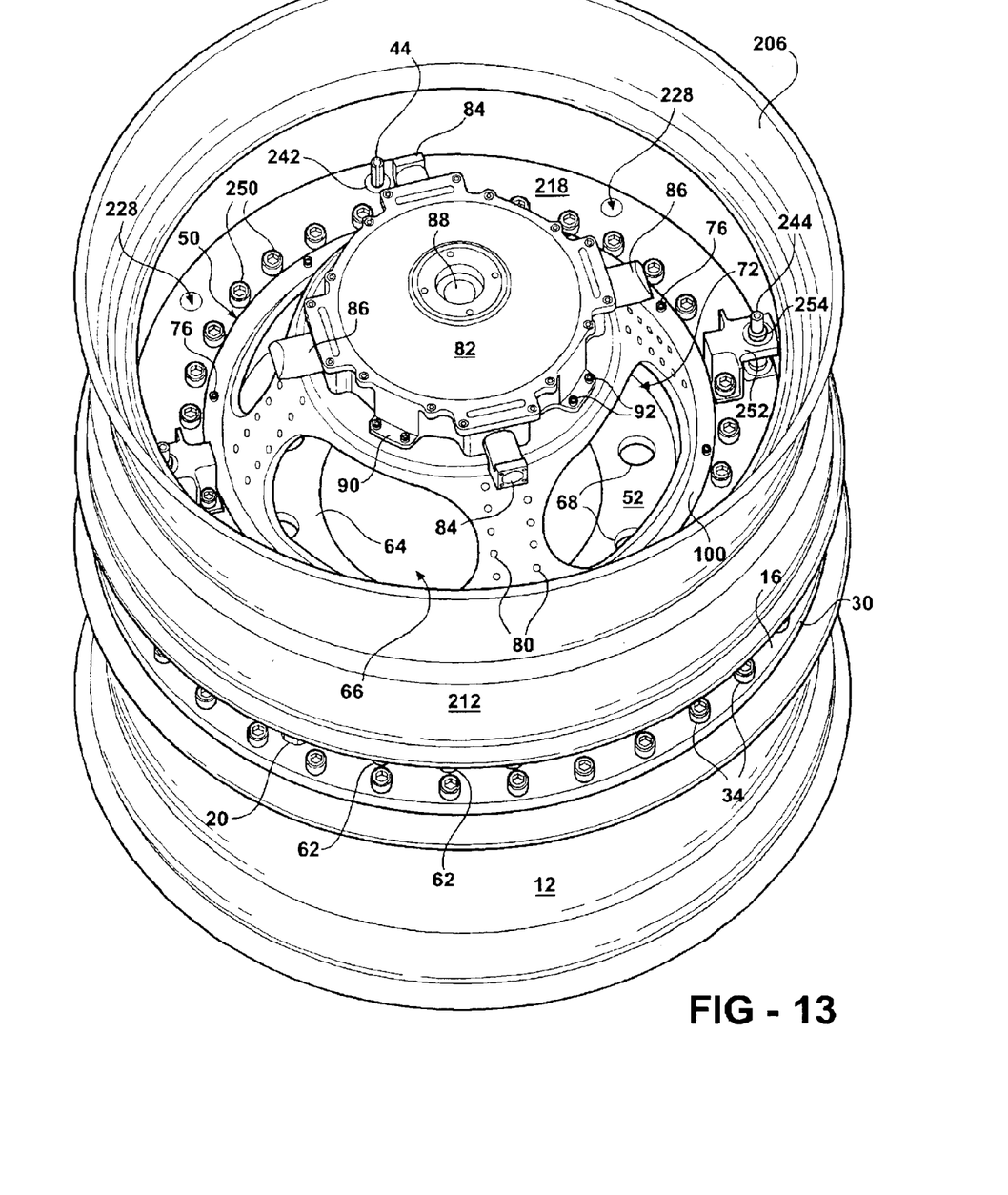
FIG. 13 is a top partial perspective view of the wheel load measurement system according to FIG. 12 with different housing connectors.

The arrangement of the two sensors 14 and 214 in the dual wheel load measurement system 210 is shown in more detail in FIGS. 12 and 13. The cross-sectional view of FIG. 12 is the dual wheel load measurement system 210 taken along the same line segments 2—2 as the view shown in FIG. 2. FIG. 13 is a perspective view of the aspect of FIG. 12 with one of the terminal connectors 86 of the housing 82 replaced by a terminal connector 84. The differences between the single wheel load measurement system 10 and the dual wheel load measurement system 210 are best described in the context of the assembly of the dual wheel load measurement system 210.

The construction of the dual wheel load measurement system 210 starts with the same steps performed with respect to the single wheel load measurement system 10. Namely, the inboard ring 16 of the inboard sensor 14 is coupled to the modified wheel rim 12 by bolts threadingly secured through the bolt holes 32 of the inboard ring 16 and the bolt holes 108 of the wheel rim 12. The strain gages are secured by a suitable adhesive to each of the beams 20, 22, 24, 26, and the conductors, or wires, 128 are connected between the appropriate strain gage grids 20a-bb, 22a-bb, 24a-bb, 26a-bb. The first member 52 of the hub adapter 50 is placed within the inner annular edge 46 of the outboard ring 18 such that the central aperture 66 faces the inboard ring 16. The bolts 62 are then used to secure the first member 52 to the outboard ring 18 by threading the bolts 62 through passages formed by the bolt holes 48 of the outboard ring 18 and the bolt holes 58 of the first bolt flange 54. The ends of the wires 128 of the bridge circuits formed by the strain gages are appropriately connected to one or more terminal connectors 44 mounted in a respective wire passage 42 of the outboard ring 18. The wires 128, with or without the cable ties, are then covered with the protective coating, as are the exposed ends of the terminal connectors 44.

The construction of the system 210 departs from the sequence of constructing the system 10 after this step in that the outboard wheel sensor 214 is next constructed. A modified wheel rim 212 is secured to the inboard ring 216. The wheel rim 212 is modified in the same manner as the wheel rim 12. Therefore, the modified wheel rim includes an annular leg 204 secured to a cornice-shaped annular mounting member 202, which is itself welded to the inner surface 206 of the wheel rim 212. The outboard wheel rim 212 is aligned with the inboard ring 216 such that bolt holes 208 of the mounting member 202 are lined up with the bolt holes (not shown) of the inboard ring 216, which are similar to the bolt holes 32 of inboard ring 16. The outboard wheel rim 212 is then secured to the outboard sensor 214 by tightening bolts (not shown) that are similar to bolts 34 through the aligned bolt holes 208 and the bolt holes of the inboard ring 216. Preferably, the outer annular edge 238 of the outboard ring 218 is in close contact with the mounting member 202.

The strain gages are adhesively secured to the four beams of the outboard sensor 214. Preferably, the arrangement of the strain gage grids 20*a-bb*, 22*a-bb*, 24*a-bb*, 26*a-bb* is the same as that shown in FIG. 4 with respect to the sensor 14. This means that the strain gage grids on the first beam are arranged the same as the strain gage grids 20*a-bb* arranged on beam 20, the strain gage grids on the second beam are arranged the same as the strain gage grids 22*a-bb* arranged on beam 22, the strain gage grids on the third beam are arranged the same as the strain gage grids 24*a-bb* arranged on beam 24, and the strain gage grids on beam 226 are arranged the same as the strain gage grids 26*a-bb* arranged on beam 26. These strain gage grids of the outboard sensor 214 are then similarly connected together into appropriate bridge circuits, such as those shown in FIGS. 5–10, using wires, such as wires 128. The conductors for the inputs and outputs to the bridge circuits extend towards the outside edge 238 of the outboard ring 218 for connection to the terminal connectors 244.

The inboard ring 216, as mentioned, is preferably the same size as the inboard ring 16. Preferably, the inboard ring 216, and thus the inboard ring 16, are sized so that the inner annular edge 236 of the inboard ring 216 passes over the outer radial edge 156 of the second flange 56 and settles about a portion of the outer annular edge 154 of the first flange 54. Preferably, a small gap 256 is formed between the outer annular edge 154 of the first flange 54 and the inner annular edge 236 of the inboard ring 216. The outboard ring 218 has a smaller diameter than the inboard ring 216 such that the outboard ring 218 contacts the entire radial length of the second flange 56, and the inner annular edge 246 of the outboard ring 218 is in contact with the sidewall 110. The spacing between the first flange 54 and the second flange 56 and the spacing between the inboard ring 216 and the outboard ring 218 is such that a small gap 258 also exists between the outside axial surface of the outboard ring 18 and the inside axial surface of the inboard ring 216 when the outboard ring 218 is in contact with the second flange 56.

The sensor 214 lines up with the inboard sensor 14 such that the one or more terminal connectors 44 pass through the passage 240 in the inboard ring 216 and the passage 242 and the outboard ring 218. Additionally, the terminal connectors 244 are inserted through the apertures 242 of the outboard ring 218 in accordance with the description provided with respect to the terminal connectors 44. The free ends of the conductors from the strain gage bridge circuits are then appropriately coupled to the connectors 44, 244. The wires 128, with or without the cable ties, are then covered with the protective coating, as are the exposed ends of the terminal connectors 44, 244, as described previously with respect to the single wheel aspect. In FIG. 13, two terminal connectors 44 provide connections to the housing 82 from the strain gages secured to the beams 20, 22, 24, 26, while two terminal connectors 244 mounted in apertures 242, 90° displaced from the terminal connectors 44, supply the signals to and from the housing 82 and the strain gages secured to the four beams of the outboard sensor 214.

The placement of the outboard sensor 214 in a way such that the terminal connectors 44 pass through the apertures 240 and 242 also aligns the bolt holes 60 of the second bolt flange 56 with the bolt holes 248 of the outboard ring 218. The outboard sensor 214 is secured to the first member 52 of the hub adaptor 50 by threading the bolts 250 through a passage formed by the bolt holes 248 of the outboard ring 218 and the bolt holes 60 of the second bolt flange 56. Two each of these bolts 250 are used to secure a support 252 to the outboard ring 218 as shown in FIG. 13. As can be seen, the terminal connector 244 extends through an aperture 254 in the support 252, and a rubber grommet or ring can be used to stabilize the terminal connector 244 in the aperture 254. The support 252 fulfills the sane function as the support 96 in the single wheel load measurement system 10, supporting the terminal connector 244 from vibration during operation of a vehicle.

The next steps repeat the construction steps of the wheel load measurement system 10, starting with the selection of a second member appropriately sized for the outboard wheel rim 212, such as second member 70 or second member 100. The second member, member 100 in FIGS. 12 and 13, is secured to the first member 52 by lining up the bolt holes 78 with the bolt passages 112 of the sidewall 110 and threadingly engaging the bolts 76 with the bolt holes 78 and bolt passages 112. The housing 82, with its selected terminal connectors, whether terminal connectors 84 or 86 or a combination of both, is mounted on the second member 70, 100. Apertures 114 in the feet 90 of the housing 82 are lined up with apertures 116 in the outer axial surface of the second member 70, 100. The bolts 92 secure the housing 82 to the second member 70, 100 by threading them through the path formed by the apertures 114 and apertures 116.

As previously discussed, the two-ended connector 118 connects each terminal connector 44 to one of the terminal connectors 84, 86 of the housing 82. A similar two-ended connector can be used to connect each terminal connector 244 to one of the terminal connectors 84, 86 of the housing 82. A slip ring, such as slip ring 144 is connected to the slip ring connector 88 of the housing 82. The strain gages 20*a-bb*, 22*a-bb*, 24*a-bb* and 26*a-bb* of the inboard sensor 14 measure the forces and moments observed by the inboard wheel mounted on the inboard wheel rim 12, while the strain gages of the outboard sensor 214 measure the forces and moments observed by the outboard wheel mounted on the outboard wheel rim 212. Thus, the dual wheel load measurement system 210 can measure the three principal moments and three principal forces applied to respective wheels of a dual wheel pair.

What is claimed is:

1. A dual wheel load measurement system mountable upon an inboard wheel rim supporting an inboard wheel of a dual wheel pair and an outboard wheel rim supporting an outboard wheel of the dual wheel pair, the inboard wheel rim and outboard wheel rim rotatable about a common axis of rotation, the system comprising:

a first sensor body including:
  a first inboard ring connectable to the inboard wheel rim;
  a first outboard ring axially-spaced from the first inboard ring and connectable to a hub adapter; and
  a first plurality of beams extending between the first inboard ring and the first outboard ring;
 a first plurality of sensors operable to provide a signal indicating at least one of three principal forces and three principal moments experienced by the first sensor body, each of the first plurality of sensors fixed to an external surface of one of the first plurality of beams;
 a second sensor body axially adjacent to the first sensor body, the second sensor body including:

a second inboard ring connectable to the outboard wheel rim and identical to the first inboard ring;
   a second outboard ring axially-spaced from the second inboard ring and connectable to the hub adapter, the second outboard ring identical to the first outboard ring; and
   a second plurality of beams extending between the second inboard ring and the second outboard ring; and
   a second plurality of sensors operable to provide a signal indicating at least one of three principal forces and three principal moments experienced by the second sensor body, each of the second plurality of sensors fixed to an external surface of one of the second plurality of beams.

2. The dual wheel load measurement system according to claim 1, further comprising:
   a hub adapter including a radially-extending second flange axially spaced from the first flange; and wherein the first outboard ring is coupled to the first flange and the second outboard ring is coupled to the second flange.

3. The dual wheel load measurement system according to claim 2, further comprising:
   a housing for a plurality of signal amplifiers, the housing connected to the hub adapter and operably connectable to receive the signal from the first plurality of sensors and the signal from the second plurality of sensors and to supply output signals externally of the housing.

4. The dual wheel load measurement system according to claim 3, further comprising:
   first conductors connecting the first plurality of sensors into at least one circuit able to provide the signal indicative of the at least one of the three principal forces and three principal moments experienced by the first sensor body;
   second conductors connecting the second plurality of sensors into at least one circuit able to provide the signal indicative of the at least one of the three principal forces and three principal moments experienced by the second sensor body;
   a first connector coupled to the first outboard ring and operable to receive the signal, the first connector extending axially through an aperture in the second inboard ring and the second outboard ring; and wherein the first connector is connectable to the housing; and
   a second connector coupled to the second outboard ring and operable to receive the signal, the second connector connectable to the housing.

5. The dual wheel load measurement system according to claim 2 wherein the hub adapter further comprises:
   a first member including an axially-extending annular sidewall, the first flange and the second flange extending radially from the sidewall.

6. The dual wheel load measurement system according to claim 5 wherein the hub adapter further comprises a second member connected to an outer axial edge of the annular sidewall, and wherein the system further includes:
   a housing for a plurality of signal amplifiers; the housing connected to the second member and operably connectable to receive the signal from the first plurality of sensors and the signal from the second plurality of sensors and to supply output signals externally of the housing.

7. The dual wheel load measurement system according to claim 5 wherein the sidewall is adjacent an inner annular edge of the first outboard ring and an inner annular edge of the second outboard ring and wherein an inner annular edge of the second inboard ring is adjacent an outer annular edge of the first flange.

8. The dual wheel load measurement system according to claim 7, further comprising:
   a plurality of bolt holes extending axially through the first outboard ring and adjacent to bolt holes extending axially through the first flange, the hub adapter connected to the first outboard ring by a plurality of bolts threadingly engaged with the bolt holes of the first flange and the bolt holes of the first outboard ring; and
   a plurality of bolt holes extending axially through the second outboard ring and adjacent to bolt holes extending axially through the second flange, the hub adapter connected to the second outboard ring by a plurality of bolts threadingly engaged with the bolt holes of the second flange and the bolt holes of the second outboard ring.

9. The dual wheel load measurement system according to claim 1 wherein the first plurality of beams comprises four first beams located at 90° angles with respect to one another and second plurality of beams comprises four second beams located at 90° angles with respect to one another and wherein the external surface of each of the four first beams and each of the four second beams is identical.

10. The dual wheel load measurement system to according to claim 9 wherein the external surface has eight sides comprising two opposed radial surfaces, two opposed axial surfaces perpendicular to the radial surfaces and four connecting surfaces, each of the four connecting surfaces between one of the two opposed radial surfaces and one of the two opposed axial surfaces.

11. The dual wheel load measurement system according to claim 1 wherein the first plurality of sensors comprises at least one shear gage affixed to each of two opposed radial surfaces of each of the first plurality of beams; at least one shear gage affixed to each of two opposed axial surfaces of each of the first plurality of beams, the two opposed axial surfaces perpendicular to the radial surfaces; and at least one Poisson gage affixed to each of four connecting surfaces of each of the first plurality of beams, each of the four connecting surfaces between one of the two opposed radial surfaces and one of the two opposed axial surfaces.

12. The dual wheel load measurement system according to claim 1 wherein the first outboard ring and the second outboard ring have a smaller radius than a radius of the first inboard ring and the second inboard ring.

* * * * *